United States Patent Office 3,641,173
Patented Feb. 8, 1972

3,641,173
PRODUCTION OF POLYCYCLIC HYDROCARBONS
Richard Gregory Foster, Macclesfield, David Richard Joy, Stockton-on-Tees, and Paul Hepworth and Edward Charles Dart, Runcorn, England, assignors to Imperial Chemical Industries Limited, London, England
No Drawing. Filed Aug. 10, 1970, Ser. No. 62,613
Claims priority, application Great Britain, Aug. 12, 1969, 40,312/69
Int. Cl. C07c 13/28
U.S. Cl. 260—666 PY      14 Claims

ABSTRACT OF THE DISCLOSURE

Polycyclic hydrocarbons are produced by a three stage process in which a cyclopentadiene is condensed with an acyclic substituted olefine, the substituents removed from the intermediate to form a double bond and the product in turn reacted with an acyclic conjugated di-olefine. For example, vinyl chloride may be reacted with cyclopentadiene to form nortricyclyl chloride, the latter dehydrohalogenated with a sodium alcoholate, and the norbornadiene produced condensed with isoprene to form 1,4-endomethylene-6-methyl - 1,4,5,8,9,10 - hexahydronaphthalene. By varying the cyclopentadiene to vinyl chloride ratio in the first stage polycyclic ring structures containing an increasing number of rings may be obtained.

The present invention relates to the production of polycyclic hydrocarbons.

According to the invention a process for the production of polycyclic hydrocarbons of general formula:

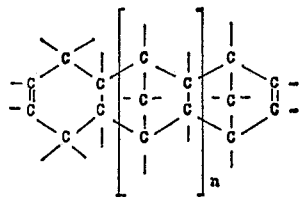

comprises:

(a) condensing a cyclopentadiene with an acyclic substituted olefine of formula

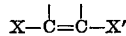

(b) removing XX' from the intermediate so formed and,
(c) condensing the product of (b) with an acyclic conjugated diolefine of structure

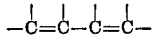

In the above general formula $n$ is zero or a whole number preferably a small whole number e.g. 1 to 3. $n$ is most preferably zero however, the polycyclic hydrocarbon thereby being a naphthalene derivative.

X and X' which may be the same or different are atoms or groups which, when linked to a carbon atom which is itself attached by a single bond to a carbon atom linked to a like atom or group, are capable of removal as XX' to form a double bond between said carbon atoms. X and X' may be hydrogen or an ester group, particularly an ester derived from a lower alkanoic acid containing up to six carbon atoms such as an acetate group. If desired X and/or X' may be converted to other groups more readily removable e.g. an ester group may be converted to an alcohol in which case the XX' removed may be HOH i.e. water. Preferably however X and/or X' are halogen most preferably chlorine. In particular X may be hydrogen and X' halogen such as chlorine because we have found that hydrogen halide (XX') is most readily removed with minimum by-product formation. Removal of the hydrogen halide may be achieved by means of a base, suitably an alkali metal or alkaline earth metal salt of an alcohol particularly a sodium or potassium alkoxide such as tert.butoxide, iso-octoxide or nonoxide. In general the isopropoxide or alkoxides containing 4 to 10 carbon atoms may be used as may the alkoxides of di- or trihydric alcohols containing a similar number of carbon atoms. Removal of hydrogen halides by the alkali metal alkoxide is preferably carried out in the refluxing alcohol from which the alkoxide is derived or in a sealed system at a temperature of 180° to 350° C. preferably 180 to 250° C. e.g. 200 to 220° C. Suitably the concentration of the alkoxide in the alcohol is about one molar. If desired solvents may also be present and a lower temperature may be used. For example in dimethyl sulphoxide the hydrogen halide may be removed at a temperature in the range 50° to 100° C. It is preferred to maintain the solution of the alkoxide as nearly anhydrous as possible e.g. containing less than 1% by weight of water. It is also advantageous to remove the stage (b) product from the reaction zone as soon as possible after its formation e.g. by distillation. This is particularly recommended if norbornadiene is the stage (b) product.

The residual valencies in the reactants in the process i.e. the cyclopentadiene, the acyclic substituted olefine and the acyclic conjugated diolefine may be satisfied by hydrogen or by hydrocarbon or non-hydrocarbon substituents provided that these do not adversely affect the reaction taking place. Suitable hydrocarbon substituents include alkyl groups, particularly lower alkyl groups containing up to six carbon atoms e.g. methyl or ethyl groups. Chlorine and bromine are examples of non-hydrocarbon substituents. Cyclopentadiene itself (or in the form of dicyclopentadiene) is a favoured reactant with a vinyl derivative such as vinyl chloride to yield norbornenyl chloride which on dehydrochlorination yields norbornadiene. The preferred acyclic conjugated diolefine is isoprene because this leads to particularly valuable products particularly when condensed with norbornadiene. Other acyclic conjugated diolefines such as butadiene, piperylene and 2,3-dimethylbutadiene may also be used.

The product of stage (a) has the general formula:

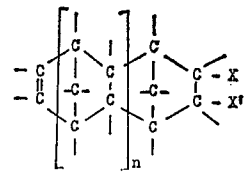

and is produced by the reaction of the cyclopentadiene with the acyclic substituted olefine. This reaction may be conducted at elevated temperature and pressure e.g. temperatures in the range 0° to 300° C. preferably 100° to 250° C. most preferably 185 to 195° C. The pressure is usually the autogeneous pressure of the reactant at the temperature of the reaction e.g. up to 200 atmospheres. The value of $n$ is determined by the molar proportion of cyclopentadiene to the acyclic substituted olefine used. Thus for $n$ to be 0 the molar ratio of cyclopentadiene to olefine should preferably be 0.1:1 to 1:1 more preferably 0.25:1 to 1:1 particularly 0.25:1 to 0.5:1 while for $n$ to be 1 the ratio should preferably be 1.75:1 to 2.25:1. The reaction time should preferably be 0.5 to 3.0 hours more preferably 1.5 to 2.5 hours. If desired a solvent may be used for the reaction preferably an aprotic solvent e.g. diethyl ether, tetrahydrofuran, esters such as dinonylphthalate, aromatic hydrocarbons such as benzene and xylene and cycloparaffins and paraffins such as cyclohexane and n-octane respectively.

The product after stage (b) has the general formula:

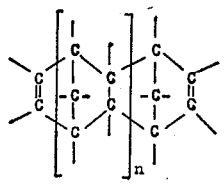

and is condensed with the acyclic conjugated diolefine preferably at elevated temperature and pressure. Temperatures in the range 0° to 300° C. preferably 50° to 250° C. more preferably 170° to 210° C. e.g. 170° to 190° C. The pressure is generally the autogenous pressure of the reactants at the temperature under consideration e.g. up to 200 atmospheres particularly 1 to 100 atmospheres. Preferably the stage (b) product is present in excess more preferably in a proportion of 2 to 10 particularly 2 to 5 mole stage (b) product to 1 mole acyclic conjugated diolefine. In this stage it is preferred not to use a solvent, but if one is used it should be an aprotic solvent.

If desired, mixtures of acyclic conjugated diolefines, e.g. isoprene and 1,3-dimethylbutadiene, such as are obtained as a refinery distillation stream may be used to give a mixed product suitable as a comonomer. Alternatively a similar distillation stream e.g. containing hydrocarbons of 4 to 8 carbon atoms, may be treated to remove all but one conjugated diene and the mixture remaining comprising paraffins, mono-olefines, non-conjugated diolefines, acetylenes and the one conjugated diene may then be used without further purification, the residual paraffins, non-conjugated diolefines, acetylenes and monoolefines not interfering with the reaction. For example, such a "concentrated" refinery stream may contain isoprene as the sole conjugated diene and be suitable for use in the present process.

The products of the process are useful as termonomers in ethylene/propylene/termonomer copolymers. For this purpose it is preferred that one of the doubly bonded carbon atoms in the cyclohexene ring is substituted by a lower alkyl group such as a methyl group. A particularly useful product is 1,4-endomethylene - 6 - methyl-1,4,5,8,9,10 - hexahydronaphthalene which may be produced from cyclopentadiene, vinyl chloride and isoprene by the present process.

The invention will now be further described with reference to the following examples.

EXAMPLE

Dicyclopentadiene (175 grams 1.3 mole) was heated in an autoclave at 190° C. with vinyl chloride (320 grams 5.1 mole) for three hours. Norbornenyl chloride B.P. 50 to 60° C./10 mm. was produced and separated by fractional distillation.

150 mls. of tert.butanol and 6.9 grams of sodium were heated for 3 hours at 140° C. in a 250 cc. rocking autoclave. The mixture was then cooled, 33 grams norbornenyl chloride added and reheated to 200° C. for 10 hours. The product was water washed and extracted three times with 40/60 petroleum ether. The extract was dried over sodium sulphate for 2 hours and then fractionally distilled to recover the norbornadiene produced. The yield of norbornadiene was 15.4 grams.

146.2 parts of norbornadiene and 27.3 parts of isoprene (i.e. a molar proportion of norbornadiene:isoprene of 4:1) were heated in a pressure vessel under a nitrogen atmosphere at 170° C. for 15 hours. At the end of the reaction 167.0 parts of the contents of the reaction vessel were distilled initially at atmospheric pressure to recover the unreacted norbornadiene which was suitable for recycle. Continuation of the distillation produced a fraction boiling within the range 82° C. to 102° C. (mainly 101° C.) at 16 mm. pressure which was shown by analysis to contain 93% of 1,4 - endomethylene - 6 - methyl-1,4,5,8,9,10 - hexahydronaphthalene (4 - methyl-tricyclo-[6,2,1,0$^{2-7}$]undecadiene-4,9).

The following examples are illustrative of the individual stages of the process of the invention. Thus Example 2 illustrates stage (a), Example 3 stage (b) and Examples 4 and 5 stage (c).

EXAMPLE 2

The apparatus consisted of a 1 litre autoclave fitted with cooling coils and heating mantle.

The autoclave was charged with a weighed quantity of dicyclopentadiene through a tundish and the vinyl chloride was added from a previously charged bomb. The autoclave and contents were then heated to the required temperature and maintained there for the preset reaction time.

No samples were taken during the course of the reaction. At the end of the reaction time the autoclave was cooled to 40° C. and the excess vinyl chloride flashed off, condensed in catchpots cooled in methanol and solid dioxide, and weighed. The reaction product was egged out of the reactor, weighed and analysed by gas liquid chromatography. The results of a series of experiments under differing conditions are given in the following table.

| Experiment | Time, hr. | Temperature, °C. | Mole ratio, VC/CPD | Yield, NBC on VC, percent | Yield, NBC on CPD, percent | Yield, NBC plus NTC on VC, percent | Yield, NBC plus NTC on CPD, percent |
|---|---|---|---|---|---|---|---|
| a | 1 | 190 | 2.24 | 90.9 | 80.2 | 90.9 | 80.2 |
| b | ½ | 190 | 2.15 | 93.4 | 49.3 | 97.2 | 51.2 |
| c | 2½ | 190 | 2.22 | 90.5 | 88.2 | 90.5 | 88.2 |
| d | 2 | 190 | 1.65 | 80.2 | 62.8 | 82.0 | 64.2 |
| e | 2 | 190 | 4.06 | 57.8 | 57.5 | 72.3 | 72.0 |
| f | 1 | 200 | 4.53 | 63.6 | 56.5 | 66.7 | 59.0 |
| g | 2 | 200 | 2.20 | 68.8 | 56.4 | 68.8 | 56.8 |
| h | 3 | 190 | 2.20 | 67.4 | 59.2 | 79.7 | 70.0 |
| i | 3 | 190 | 2.0 | 59.6 | 51.8 | 80.1 | 69.6 |

NOTE.—VC=vinyl chloride; CPD=cyclopentadiene; NBC=norbornenyl chloride; NTC=nortricyclyl chloride (formed from NBC by isomerisation).

EXAMPLE 3

Solutions of sodium hydroxide in the alcohols were prepared by heating sodium hydroxide pellets in the alcohol in a flask fitted with a Dean and Stark head. The water of reaction was removed as an azeotrope with the alcohol and the water separated, the alcohol being run back into the flask. Alternatively the sodium alkoxide was prepared by dissolving metallic sodium in the alcohols. Both methods of preparation produced on approximately 1 molar solution of the sodium alkaoxide in the alcohol.

The following results were obtained by reacting norbornenyl chloride with the sodium alkoxides in sealed Carius tubes in a Carius oven. The reaction products were analysed by gas-liquid chromatography for norbornadiene and for norbornenyl chloride isomers and by Mohr titration (silver nitrate with potassium chromate indicator) for liberated chloride ion, after neutralisation with nitric acid.

| Experiment | Alkoxide | Temperature, °C. | Time, hrs. | NBC converted | Yield NBD on NBC converted |
| --- | --- | --- | --- | --- | --- |
| a | Sodium iso-octoxide | 200 | 1 | 21.6 | 100 |
| b | Sodium nonoxide | 200 | 2 | 79.3 | 76.5 |
| c | Sodium salt of phenyl dimethyl carbinol | 200 | 2 | 59.4 | 100 |
| d | Sodium iso-octoxide | 200 | 2 | 77.6 | 76.9 |
| e | Sodium iso-octoxide containing 2.4% water | 240 | 5 | 79.0 | 47.7 |
|   | Sodium iso-octoxide containing 0.6% water | 240 | 5 | 92.7 | 66.2 |
| f | Sodium iso-octoxide [1] | 250 | 1 | 82.4 | 63.9 |

[1] Alkoxide prepared from metallic sodium.

NOTE.—NBC=norbornenyl chloride, NBD=norbornadiene;

$$NBC\ converted = \frac{Original\ weight\ of\ NBC - final\ weight\ of\ NBC}{Original\ weight\ of\ NBC} \times 100$$

$$Yield\ NBD\ on\ NBC\ converted = \frac{Final\ weight\ of\ NBD}{Weight\ of\ NBD\ if\ all\ NBC\ converted\ had\ formed\ NBD} \times 100$$

EXAMPLE 4

The apparatus was a 5 litre autoclave constructed in chromium-stainless steel and fitted with an 18/8/titanium internal cooling coil. The autoclave was also provided with a paddle stirrer. A separate vessel was produced, connected to the autoclave from which isoprene could be delivered by means of an applied nitrogen pressure.

In operation, the required quantity of norbornadiene was charged to the autoclave and isoprene to the isoprene vessel and the autoclave heated by means of electric heaters to the required temperature. When the temperature was reached the electric heaters were cut out and the isoprene delivered to the autoclave by means of the nitrogen pressure (11.5 bars). Complete isoprene addition was indicated by a sharp rise in the autoclave pressure to the egging pressure of the nitrogen.

Although the autoclave temperature generally fell by 10–20° C. on addition of the isoprene it rapidly rose due to the heat of reaction. When the autoclave temperature was 3° C. above the desired reaction temperature the cooling water was turned on. Later during the reaction the cooling water was dispensed with and the electric heaters used to maintain the reaction temperature.

After the reaction period the heaters were turned off and the cooling water turned fully on. The autoclave was discharged with its contents were at a temperature below 30° C.

Samples of the reaction mixture were withdrawn from the autoclave during the reaction and both they and the final product were analysed by gas-liquid chromatography. The reaction product was also distilled to recover the 1,4-endomethylene-6-methyl - 1,4,5,8,9,10 - hexahydronaphthalene (EMHN).

The results of the various experiments are given in the following table.

| Experiment | NBD:IP, mole ratio | Time | Temperature, °C. | Conversion, percent | | Percent yield EMHN based on— | |
| --- | --- | --- | --- | --- | --- | --- | --- |
|   |   |   |   | NBD | IP | NBD converted | IP converted |
| a | 4.21 | 2 hrs., 7 mins | 170 | 7.47 | 55.4 | 98.0 | 70.4 |
| b | 5.73 | 3 hrs., 10 mins | 170 | 8.95 | 72.9 | 97.5 | 78.7 |
| c | 4.44 | 3 hrs., 55 mins | 170 | 17.8 | 63.0 | 96.9 | 72.5 |
| d | 4.61 | 2 hrs., 57 mins | 180 | 11.0 | 85.5 | 95.8 | 78.3 |
| e | 1.03 | 3 hrs | 180 | 35.2 | 89.2 | 85.3 | 40.4 |
| f | 2.02 | 3 hrs | 190 | 30.7 | 97.8 | 89.9 | 58.2 |
| g | 3.00 | 3 hrs | 160 | 9.5 | 66.2 | 96.4 | 65.0 |
| h | 3.20 | 3 hrs | 200 | 26.4 | 100.0 | 92.2 | 66.0 |

NOTE.—NBD=norbornadiene, IP=isoprene.

EXAMPLE 5

The apparatus and technique were the same as in Example 4. Instead of essentially pure isoprene however an "isoprene concentrate" was used. The "isoprene concentrate" was obtained from a steam cracked naphtha by first separating a C–5 stream by distillation and then subsequently distilling the C–5 stream to give an "isoprene concentrate" and a "piperylene concentrate." The C–5 stream comprised hydrocarbons boiling in the range 10° to 80° C. and the second distillation was conducted to give a fraction boiling in the range 10° to 37° C. ("isoprene concentrate") and a residue, the "piperylene concentrate." The "isoprene concentrate" had the following composition.

|   | Percent |
| --- | --- |
| 3-methyl butene-1 | 0.1 |
| Isopentane | 9.4 |
| 1:4 pentadiene | 1.3 |
| 2-methyl-2-butene | 1.6 |
| Pentene-1 | 5.9 |
| 2-methyl-1-butene/butyne-2 | 10.5 |
| n-Pentane | 30.7 |
| Trans-2-pentene | 3.5 |
| Trans-piperylene | 0.5 |
| Isoprene | 36.5 |

The results of three experiments conducted under different reaction conditions are given below.

| Experiment | NBD:IP, mole ratio | Time, hrs. | Temperature, °C. | Conversion, percent | | Percent yield EMHN based on— | |
| --- | --- | --- | --- | --- | --- | --- | --- |
|   |   |   |   | NBD | IP | NBD converted | IP converted |
| a | 2 | 3 | 180 | 19.9 | 68.5 | 92.5 | 68.5 |
| b | 1 | 3 | 190 | 31.0 | 72.9 | 87.7 | 72.9 |
| c | 3 | 3 | 190 | 19.5 | 80.8 | 89.8 | 80.8 |

We claim:
1. A process for the production of polycyclic hydrocarbons of general formula

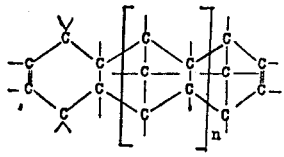

in which $n$ is zero or a whole number which comprises in combination the following reaction steps:
  (a) a cyclopentadiene is condensed with an acyclic substituted olefine of formula

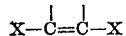

in which X and X', which may be the same or different, are atoms or groups which, when linked to a carbon atom which is itself attached by a single bond to a carbon atom linked to a like atom or group, are capable of removal as XX' to form a double bond between said carbon atoms,
  (b) XX' is removed from the intermediate formed in step (a) and
  (c) the product of step (b) is condensed with an acyclic conjugated diolefine of structure

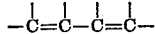

2. The process of claim 1 in which the residual valencies in the cyclopentadiene, the acyclic-substituted olefine and the acyclic conjugated diolefine are satisfied by hydrogen, by alkyl groups or by chlorine or bromine atoms.
3. The process of claim 1 in which X and/or X' are hydrogen, an ester group or a halogen atom.
4. The process of claim 3 in which X is hydrogen and X' a halogen.
5. The process of claim 2 in which the acyclic conjugated diolefine is butadiene, isoprene, piperylene or 2,3-dimethylbutadiene.
6. The process of claim 1 in which the temperature in step (a) is in the range 100 to 250° C.
7. The process of claim 1 in which the ratio of the cyclopentadiene to acyclic substituted olefine in step (a) is 0.1:1 to 1:1.
8. The process of claim 4 in which XX' is a hydrogen halide which is removed in step (b) by means of a base.
9. The process of claim 8 in which the base is an alkali metal or alkaline earth metal salt of an alcohol.
10. The process of claim 8 in which the temperature is 180 to 250° C.
11. The process of claim 1 in which the temperature in step (c) is 50° to 250° C.
12. The process of claim 1 in which the mole ratio of step (b) product to acyclic conjugated diolefine in the step (c) reaction is 2 to 10:1.
13. The process of claim 1 in which 1,4-endomethylene-6 - methyl-1,4,5,8,9,10-hexahydronaphthalene is produced by the following combination of reaction steps:
  (a) cyclopentadiene is reacted with vinyl chloride for 0.5 to 3.0 hours at a temperature of 185 to 195° C. and a ratio of cyclopentadiene to vinyl chloride in the range 0.25:1 to 0.5:1,
  (b) the norbornenyl chloride produced in step (a) in dehydrochlorinated by reaction with sodium isopropoxide or the sodium salt of an alcohol containing 4 to 20 carbon atoms at a temperature of 180° to 250° C. and,
  (c) the norbornadiene produced in stage (b) is condensed with isoprene at a temperature of 170° to 210° C. and mole ratio of norbornadiene to isoprene of 2 to 5:1.
14. The process of claim 13 in which the isoprene is contained in a mixture of $C_4$ to $C_8$ hydrocarbons comprising paraffins, non-conjugated diolefines, acetylenes and monoolefines derived from a refinery distillation stream.

References Cited
UNITED STATES PATENTS
3,565,962  2/1971  Walmsley ———————— 260—666

DELBERT E. GANTZ, Primary Examiner
V. O'KEEFE, Assistant Examiner

U.S. Cl. X.R.
260—648 C